United States Patent
Morales et al.

(10) Patent No.: US 8,092,591 B2
(45) Date of Patent: Jan. 10, 2012

(54) LIGHT STRUCTURAL MORTAR COMPOSITIONS

(76) Inventors: Rodrigo Lobo Morales, Monterrey (MX); Patricio Miguel O Farrill González, Monterrey (MX)

( * ) Notice: Subject to any disclaimer, the term of this patent is extended or adjusted under 35 U.S.C. 154(b) by 0 days.

(21) Appl. No.: 12/523,947

(22) PCT Filed: Feb. 20, 2009

(86) PCT No.: PCT/MX2009/000018
§ 371 (c)(1),
(2), (4) Date: Jan. 18, 2011

(87) PCT Pub. No.: WO2009/123431
PCT Pub. Date: Oct. 8, 2009

(65) Prior Publication Data
US 2011/0139036 A1 Jun. 16, 2011

(30) Foreign Application Priority Data
Mar. 31, 2008 (MX) .................. MX/A/2008/004324

(51) Int. Cl.
*C04B 28/16* (2006.01)
*C04B 28/10* (2006.01)
(52) U.S. Cl. ...................... 106/775; 106/776
(58) Field of Classification Search .............. 106/775, 106/776
See application file for complete search history.

(56) References Cited

U.S. PATENT DOCUMENTS

| | | | | |
|---|---|---|---|---|
| 4,016,240 A | * | 4/1977 | Hinsche et al. | 423/170 |
| 4,233,080 A | | 11/1980 | Koeppel | |
| 4,300,324 A | * | 11/1981 | Koeppel | 52/612 |
| 5,910,215 A | * | 6/1999 | Frouin et al. | 106/772 |
| 6,641,658 B1 | * | 11/2003 | Dubey | 106/705 |
| 6,709,508 B2 | * | 3/2004 | Dietrich et al. | 106/724 |
| 7,029,527 B2 | * | 4/2006 | Gaudry et al. | 106/695 |

FOREIGN PATENT DOCUMENTS

| | | |
|---|---|---|
| DE | 4218154 | 12/1993 |
| EP | 0990627 | 4/2000 |
| ES | 2024379 | 2/1992 |
| GB | 374455 | 7/1932 |
| GB | 514267 | 11/1939 |
| GB | 523450 | 7/1940 |
| GB | 1159200 | 7/1969 |
| JP | 2003-104766 | * 4/2003 |
| JP | 2003-321259 | * 11/2003 |
| JP | 2005-324982 | * 11/2005 |
| MX | NL/2002/000032 | 11/2004 |
| WO | WO 96230901 | 7/1996 |
| WO | 2010/033009 A1 | * 3/2001 |
| WO | WO 2005/054152 | 6/2005 |
| WO | WO 2005/087683 | 9/2005 |
| WO | WO2005/087683 A1 | * 9/2005 |
| WO | WO 2007/137683 | 12/2007 |

OTHER PUBLICATIONS

Derwent-Acc-No: 1992-090685, abstract of ES 2024379 A (Feb. 1991).*
Anhydrite; Wikipedia, The Free Encyclopedia; http://en.wikipedia.org/wiki/Anhydrite; as accessed Jun. 30, 2011; 3 pages.
Profitable Uses for Anhydrite from the Production of Hydrofluoric Acid; Gulf Fluor; BUSS ChemTech; 7 pages.

* cited by examiner

*Primary Examiner* — Anthony Green
(74) *Attorney, Agent, or Firm* — Thorpe North & Western LLP

(57) ABSTRACT

Light structural mortar compositions containing light loads, type II synthetic anhydrite and additives and methods for the production and use thereof are disclosed and described. Such compositions may be useful for application in ferro-cement constructive systems in order to provide thermal, acoustic and anti-seismic characteristics desirable for coating on interior and exterior walls and ceilings/roofs, as a substitution of cement-based mortar.

10 Claims, No Drawings

LIGHT STRUCTURAL MORTAR COMPOSITIONS

FIELD OF THE INVENTION

This invention is referring to a formula and procedure to produce a light structural mortar containing light loads, type II synthetic anhydrite and additives. It would be used in ferro-cement construction systems, thermal, acoustic and anti-seismic as well as a coating on interior and exterior walls and ceilings/roofs in substitution of cement-based mortars, thus helping to prevent global warming. This light structural mortar is an exceptional substitute of Portland cement-based mortar and loads of limestone and silica because of its high dimensional stability since it does not have appreciable expansion or contraction with temperature changes, thus eliminating the appearance of cracks due to temperature and plastic surface cracks due to a loss in volume.

This invention also provides methods for manufacturing, the formula used and methods for using and/or utilizing the components mentioned.

BACKGROUND OF THE INVENTION

The formula and procedure for manufacturing light structural mortar containing light loads, type II synthetic anhydrite and additives, for its application in ferro-cement construction systems, thermal, acoustic and anti-seismic as well as a coating on interior and exterior walls and ceilings/roofs, to be used as a substitute of Portland cement-based mortar, thus helping to prevent global warming, it is an exceptional substitute of Portland cement and limestone and silica loads, due to the fact that the light structural mortar has great dimensional stability, resulting to low expansion and contraction with temperature changes, eliminating the appearance of cracks due to temperature changes and plastic surface cracks due to a loss in volume. The formula for this invention consists of: a) type II synthetic anhydrite; b) calcium hydroxide; c) light loads and d) soluble additives.

Documents WO 2005/054152 A1, (Summary of) DE 4218154, GB 374455, EP 0725044, EP 0990627, U.S. Pat. No. 4,233,080, U.S. Pat. No. 4,300,324, GB 1,159200, GB 523450, GB 514267, Application NL/on/2002/000032, describe cementing compositions containing anhydrite, but the formula differs from this invention because they use cement, plus the percentages and components are different, the presence of cement in these formulas results in poor and limited characteristics for their application in ferro-cement systems and for their application on surfacing interior and exterior walls and ceilings/roofs, because they undergo great expansion and contraction with temperature changes, causing the appearance of cracks with temperature changes and, in addition, there is great deal of water consumption which changes the volume of the mass causing the later appearance of plastic surface cracking, high PH which makes manual handling risky in addition to other limiting factors.

SUMMARY OF THE INVENTION

This invention is a composition and a procedure to produce Light structural mortar containing light loads, type II synthetic anhydrite and additives, for its application in ferro-cement constructive systems giving it: thermal, acoustic and anti-seismic characteristics and for their use as a coating on interior and exterior walls and ceilings/roofs, to be used in substitution of cement-based mortar thus helping to prevent global warming. This light structural mortar is an exceptional substitute for the Portland cement-based mortar that includes limestone and silica, due to its high dimensional stability since it does not show appreciable expansion and contraction due to temperature changes thus eliminating the appearance of cracks due to temperature and surface cracks due to the loss of volume.

The composition contains the following components in the % in weight: a) type II synthetic anhydrite from 80% to 95%; b) calcium hydroxide from 2% to 6%; c) light loads from 4% to 20%, selected from natural expanded Piró and/or artificial ones such as Tepezil, Pumicita Jal and/or Perlite and/or mixtures of these; d) soluble additives of acrylic styrene resins from 0.05% to 3%, potassium sulfate from 0.03% to 1.5% and aluminum sulfate from 0.05 to 2%.

DESCRIPTION OF THE INVENTION

This invention is a formula and procedure for manufacturing light structural mortar containing light loads, type II synthetic anhydrite and additives, for its application in Ferro-cement systems, giving it thermal, acoustic and anti-seismic characteristics, and for its use as a coating on interior and exterior walls and ceilings/roofs, substituting Portland cement-based mortar, thus helping to prevent global warming, it is an exceptional substitute for Portland cement-based mortar containing limestone and silica loads, due to the fact that light structural mortar has great dimensional stability with minor expansion and contraction due to temperature changes which surprisingly eliminates the appearance of cracks due to temperature and plastic surface cracking due to a loss of volume.

The formula for this invention is comprised of: a) type II synthetic anhydrite; b) calcium hydroxide; c) light loads and d) additives.

With this composition surprising characteristics are achieved in its application in ferro-cement constructive systems and in its application on surfaces of interior and exterior walls and ceilings/roofs, which cannot be achieved with Portland cement-based mortar.

Ferro-cement constructive systems have been in existence for a long time and they consist of placing an iron mesh in different amounts and with different resistances, depending on construction specifications, usually applying type I, II or III Portland cement-based mortar systems mixed with limestone or silica sand as well as water in the necessary proportion to achieve the required resistance.

The definition of construction mortar is the mixture of cement, sand and water, which differs from concrete which is the mixture of cement, sand, stone and water. The function of mortar is to provide protection from the weather, to resist penetration of water and it is used for plastering and evening up the walls of constructions made of cement block, brick walls, bricks, adobe, ashlars, drywall/sheetrock and panels or continuous structures made of wire rod or mesh (Ferro-cement systems).

Traditional mortar is formulated with different materials that include:
　Lime Mortar (Lime-Sand).
　Simple Mortar (Sand-Cement).
　Compound Mortar (Lime, Cement, Sand).
　Stucco (Cement-Marble and Additives).
　Paste (Resins containing Calcium Carbonate and/or silica).
　Plaster or plaster of Paris used only to plaster interior surfaces.
　The Mortar.

The Mortar is selected depending on the constructive elements used in the construction, for example, for ferro-cement structural systems, simple and/or compound mortars are traditionally applied over mesh, which tends to develop plastic surface cracks due to the volume of the recently applied mixture, because of the following; a) a reaction of the water with the cement, b) absorption by sand and c) evaporation into the environment. These cracks are then covered with a layer of mortar prepared with the same formula but one that is much richer in cement for final finishing or for plastering, although many plastic surface fissures appear for the same previously mentioned reasons. These cracks are sealed once the mixture dries and the density of these mixtures is usually between 2,200 and 2,400 kilos per cubic meter which results in low thermal resistance as well as low dimensional stability resulting in elements that have great expansion and contraction characteristics.

To surface drywall or sheetrock, spackling paste is used and it is only applied in very thin layers and only as protection. For brick walls, simple mortar or compound mortar is recommended since it is applied in thicker layers, protecting and more efficiently smoothing out the irregularities of the wall and the same is used and applied over mesh on plastic surface fissures and it is also used to plaster and seal.

It is also selected due to the cost of surfacing, for example, to cover a brick or ashlar wall, which is very irregular, for which a layer that is 2 cm. thick of paint or stucco or spackling paste would have to be used. This increases costs because the materials are more expensive and there is a great deal of time and labor involved. The previously mentioned coatings do not have thermal or acoustic insulation characteristics and, for that reason, some types of insulation have to be applied to the construction; for example, polyurethane, or polystyrene and these surfaces are used to protect the insulation from the weather.

To solve all of the problems and inconveniences mentioned and that occur with the use of conventional mortar, especially cement mortars, the mortar in this invention is lightweight and it has dimensional stability, thermal resistance, acoustic and anti-seismic characteristics.

The components that form the compound in the percentages indicated result in coatings with surprising thermal insulation, acoustic and anti-seismic characteristics in ferro-cement constructive systems and for its use a coating on interior and exterior walls and ceilings/roofs without the cracks that appear with temperature changes, likewise, plastic cracks are not present since this mortar uses very little water in the reaction.

Since there is no cement in the formula, there is lower water consumption and the light components act as a deposit for avoiding water loss in the initial setting stage, as well as for avoiding loss from evaporation after the final setting time and its use in finishing is only recommended for plastering and not for covering up fissures or cracks.

In addition to the formula for manufacturing light structural mortar containing light loads, type II synthetic anhydrite and additives in this invention, it is based on the selection of the amounts of the components to fulfill the standards and characteristics requested and desired by the construction industry.

The composition for the manufacture of a light structural mortar containing light loads, type II anhydrite and additives of this invention solves the following problems:

1) It is a low-cost solution to the need for thermal and acoustic insulation, for that reason, it is ideal for low income housing.

2) It is used as a light structural mortar in ferro-cement constructive systems.

Desired properties such as durability, resistance, dimensional stability, lightness, thermal and acoustic insulation are found in this invention and they do not exist when Portland cement-based mortars containing limestone or silica are used in ferro-cement constructive systems for homes and service spaces. As mentioned previously, this is due to its great dimensional stability and low expansion and contraction with temperature changes, surprisingly eliminating the appearance of cracks due to temperature changes and plastic surface cracks due to loss of volume.

Mortars that include Portland cement in their formula have low dimensional stability (great expansion and contraction) causing cracks to appear with temperature changes. In addition, there is water consumption in the early stage because of the use of Portland cement which leads to the appearance of plastic surface cracks due to changes in the volumetry of the mortar. The high volumetric weight of these mortars and their low resistance in early stages makes their use rare in ferro-cement constructive systems in comparison to their use in other constructive systems.

The dimensional stability of the formula of this invention is because of two factors:

a) Its low density 1,150 Kg./m$^3$ which does not cause it to get as hot or as cold as other heavier mortars therefore avoiding expansion and contraction entailed with temperature changes.

b) Its mechanical way to conglomerate or entwine because when the type II synthetic anhydrite crystals are activated by the reactants of this compounds, they grow needles that entwine with needles in neighboring crystals, forming a mass that has its own buffering characteristics against the expansion and contraction of the mass because of temperature changes. In this manner, fissures that are characteristic in all of the other types of mortars with temperature changes are avoided, especially those occurring in cement-based mortar. This conglomeration is nano-technology since there is a modification in the form of the crystal produced due to the growth and hardening of the needles of the tiny crystals and the entwining that takes place between the same, causing a mass that is a buffer for temperature changes.

In the formula of this invention, the anhydrite used is an anhydrite that is a sub-product of the chemical industry, producing an ecological cement since for each ton used in substitution of Portland cement, a great amount of heat and $CO_2$ will no longer be produced, thus aiding in the prevention of global warming.

The anhydrite used is a Type II synthetic type which is mentioned in patent number MX 226580 entitled "Improved Method for the Production of Binder from Type II Synthetic Anhydrite, Sub-product of HF Production", completely included here for reference purposes.

The anhydrite used in the formula of this invention is a type II synthetic anhydrite and it is a cubic crystal that is formed at a temperature between 400 and 600 degrees centigrade, the size of the particle causes 10% of this composition to be retained in 150 mesh. In order for this cementing product to have the special entwining characteristic, the needles of the crystals that grow and harden due to the action of the additives, make the union or conglomeration to be a mechanical one and they act as a buffer for expansion and contraction due to temperature changes. This makes the mortar in this invention very different from Portland cement-based mortar in which the union is chemical and where there is no buffer for expansion and contraction due to temperature changes.

This change in the shape of the crystal causes it to conglomerate, providing an advantage over other mortars and we call it a nano-technological union.

Another advantage for exclusively using a type II synthetic anhydrite is to obtain a white surface which does not need to be painted because it has low water absorption. In addition, if one wishes to paint it, it is easier to cover the surface due to its light color, which is different from traditional mortar based on limestone sand and cement which have darker tones. It is easily prepared and applied, controlling expenses for work materials. Quality and uniformity of this mortar is obtained because it is formulated in the Plant and to use it, only water has to be added, considerably reducing on-the-job preparation time, time in application and this reduces operational costs.

The combination of type II synthetic anhydrite, the light load and its granulometric curve, in addition to the additives in the composition, make this mortar easier to prepare since workers only add water. It is light, it weighs only 950 Kg. per dry cubic meter and significant savings are obtained in transportation since other mortars weigh 1700 to 2200 Kgs. per dry cubic meter.

This type II synthetic anhydrite provides the composition a resistance to axial compression from 150 kg./cm.$^2$ to 160 Kg./cm.$^2$ over 14 days, obtaining an economic, light, fireproof mortar with great dimensional stability and with a durability that more than fulfills characteristics required by the construction industry such as resistance, insulation, dimensional stability and, when used, no cracks will appear in thicknesses from 0.5 cm. to 2.5 cm., which contributes to savings in labor and greater speed in construction time. This material's adherence leads to minimum waste upon applying it.

The formula for the manufacture of light structural mortar containing light loads, type II synthetic anhydrite and additives, for its application in ferro-cement constructive systems with thermal, acoustic and anti-seismic characteristics and for its application in surfacing interior and exterior walls and ceilings/roofs, efficiently substitutes Portland cement mortar containing limestone and silica. The formula of this invention is: a) type II synthetic anhydrite; b) calcium hydroxide; c) light loads and d) additives.

Additives are selected from soluble resins such as styrene-acrylic resins, potassium sulfates and highly soluble aluminum sulfates and/or mixtures of the same.

These additives are selected from the list of calcium sulfate activators and they must be highly soluble and it is important to completely respect the amounts mentioned. In addition to the time the mixture must be allowed to set once it is hydrated is from 10 to 20 minutes to assure a complete reaction of the Type II synthetic anhydrite, thus avoiding the presence of additives that have not reacted in the mixture. The presence of additives that have not reacted in the mixture causes a later reaction in the presence of water which would cause the expansion of materials and cracking of the same due to the growth of needles in a later stage in the final setting time.

This is what happens in the majority of products developed with anhydrite and cement.

These additives provide an initial setting time of the mixture of up to 55 minutes which gives enough time to apply it without waste and a final setting time of 240 minutes which provides great resistance and hardness since it optimizes the growth and hardening time of the needles formed.

The light loads are selected from naturally expanded Piro and/or artificial ones such as Tepezil Pumicita Jal and/or Perlite and/or mixtures of these light loads provide thermal and acoustic insulation and a light composition.

One very important additional characteristic of this invention is its resistance to earthquakes when this mortar is used in one story ferro-cement constructive systems, thus forming a continuum. Tests were performed in the laboratories of the University of Texas in Austin and in the Laboratory of the Center of Design and Construction at the Instituto Tecnológico y de Estudios Superiores de Monterrey, testing a Dome and a house with the Kobe, Loma Prieta, Mexico City, Northridge, Managua earthquakes and to earthquakes with sine waves of 3 Hz and up to 40 of them resisted which was when some cracks in the foundation of the house appeared.

The composition preferably comprises or consists of the following components in % in weight:
 a) Type II synthetic anhydrite from 80% to 95%
 b) Calcium hydroxide from 2% to 6%
 c) Light loads from 4% to 20%
 d) Soluble additives from 0.05% to 10%

The composition is preferably made up of the following components in % in weight:
 a) Type II synthetic anhydrite from 80% to 95%
 b) Calcium hydroxide from 2% to 6%
 c) Light loads from 4% to 20%, selected from natural expanded Piro and/or artificial ones such as Tepezil Pumicita Jal and/or Perlite and/or mixtures of these.
 d) soluble additives selected from acrylic-styrene resin from 0.05% to 3%, potassium sulfate from 0.03% to 1.5% and aluminum sulfate from 0.05 to 2%

The procedure for manufacturing the composition of light structural mortar containing light loads, type II synthetic anhydrite and additives, for their application in ferro-cement systems with thermal, acoustic and anti-seismic characteristics and for their application as a coating on interior and exterior walls and ceilings/roofs is made up of the following steps:
 a) Selection of materials and proof of quality of each one;
 b) Weighing materials;
 c) Homogeneously mixing each one of the components in the proportions indicated during 20 to 120 minutes until the reaction is completed, thus avoiding later reactions in the finished product, allowing the crystals to change their shape to conglomerate or entwine, providing dimensional stability with the internal buffer of the mass using a mixer truck and/or a portable mixer, and
 d) Pouring the material in sacs or waterproof containers with valves, and
 e) Adding water in order to apply the material and letting the mixture rest and then it is hydrated during 10 to 20 minutes to assure a complete reaction with type II synthetic anhydrite and additives, avoiding the presence of additives without reaction in the mixture.

The procedure for applying the composition of light structural mortar containing light loads, type II synthetic anhydrite and additives, in ferro-cement systems includes the following steps:
 1) Iron mesh or panels are placed and tied as desired, for example: for an interior or exterior division, a false ceiling, a structure in the form of a house, of a dome or a half round, etc.
 2) Preparation. The mortar mixture is mixed in a mixing box, tray or wheelbarrow with water in a proportion of 4 to 1 in volume.
 3) Application. It is applied in layers of from 1.5 to 2.5 cm. thick on both sides with a mortar launcher, a trowel, or using a hand until the desired thickness is obtained on the iron mesh or suspended ceiling one wishes to cover.
 4) Surface Finish. A thin layer is applied with a trowel to uniformly apply the plaster and it is later smoothed with wood, a sponge, rub bricks, polystyrene.

The process of applying light structural mortar based on type II synthetic anhydrite, light loads, and additives such as surfacing interior and exterior walls and ceilings/roofs is made up of the following steps:

i) The product is prepared upon mixing it with water in a proportion of 4-1 in volume.

ii) It is applied on walls or ceilings with a trowel in thicknesses of 0.5 to 1 cm. and the surface is then finished.

3) A finishing float is applied to even out the finish or to provide the desired texture.

EXAMPLES

The following examples are to illustrate the invention and not to limit it, each possible modification by experts in the area, fall within the scope of this invention.

Example 1

A mortar composition is prepared according to % of weight:
a) Type II synthetic anhydrite from 80% to 95%
b) Calcium hydroxide from 2% to 6%
c) Light loads from 4% to 20%, selected from natural expanded Piro and/or artificial ones such as Tepezil Pumicita Jal and/or Perlite and/or mixtures of these.
d) Selected soluble additives of acrylic styrene resin from 0.05% to 3%, potassium sulfate from 0.03% to 1.5% and aluminum sulfate from 0.05 to 2%.

The materials are selected, the indicated proportion is weighed, they are mixed in a revolving mixer from 20 to 120 minutes until they are completely homogenized and they are later poured into waterproof sacks with valves. These sacks contain instructions on how to apply them and indicate that for applying them only water is added and they are left to set for 10 to 20 minutes to be sure that there is a complete reaction with the type II anhydrite and the additives, thus avoiding the presence of additives without a reaction in the mixture.

Example 2

With the mortar in example 1, two houses were constructed using the ferro-cement system, one story, a dome and a house.

They were tested in the laboratories of the University of Texas in Austin and in the Laboratory in the Center for Design and Construction at the Instituto Tecnológico y de Estudios Superiores de Monterrey. The dome and the house were placed in simulators and they were tested with the strongest earthquakes that have occurred on the planet; first the one in Kobe, followed by Loma Prieta, Mexico City, Northridge, Managua and other earthquakes with sine waves of 3 Hz successively.

The experiment of resistance to earthquakes was not stopped until earthquake number 40 at 3 Hz, due to the fact that small fissures were detected near the base and in the window.

The dome did not show fissures.

This resistance to earthquakes exceptionally surpasses that of other constructive systems.

Following table 1 shows the properties and characteristics of light structural mortar in this invention.

TABLE 1

| Standard | Description of Test | Value of Parameter |
| --- | --- | --- |
| ASTM C 109-98 | Resistance to compression for 14 days | 150 Kg./cm² |
| ASTM C567-00 | Dry volumetric weight of dust of the materials | 1000 Kg./m³ |
| ASTM C567-00 | Applied and dry volumetric weight of the material | 1150 Kg./m³ |
| ASTM C293-94 | Resistance to tension of the materials (rupture module) | 20 Kg./cm² |
| ASTM C469-94 | Elastic Module | 59,000 Kg./cm² |
| ASTM C807-89 | Initial Setting Time | 55 minutes |
| ASTM C807-89 | Final Setting Time | 4 hours |
| ASTM C642-97 | Absorption of material | <5% |
| ASTM 177-85 ASTM C518-76 | Thermal conductivity. | 0.32-0.39 W/m degrees Kelvin FACTOR R4 |

***These properties and characteristics allow for its application as a light structural mortar in ferro-cement systems and as a surfacing material, replacing Portland cement-based mortar containing limestone and silica. These properties and characteristics allow for their application as a light structural mortar in ferro-cement systems and as a surfacing material, taking the place of Portland cement-based Mortar containing limestone and silica.

What is claimed is:

1. A light structural mortar composition for use in ferro-cement constructive systems comprising:
   a) a type II synthetic anhydrite from 80% to 95% by weight;
   b) calcium hydroxide from 2% to 6% by weight;
   c) light loads weighing less than 1700 kg per dry cubic meter from 4% to 20% by weight, and;
   d) soluble additives from 0.05% to 10% by weight.

2. The light structural mortar composition of claim 1, wherein the light loads are volcanic rock selected from: natural expanded Piro, Tepezil, Pumice, expanded Perlite, and mixtures thereof.

3. The light structural mortar composition of claim 1, wherein the soluble additives are selected from: acrylic styrene resin, potassium sulfate, and aluminum sulfate and mixtures thereof.

4. The light structural mortar composition of claim 3, wherein the acrylic styrene resin is present in an amount of from 0.05% to 3% by weight.

5. The light structural mortar composition of claim 3, wherein the potassium sulfate is present in an amount of from 0.03% to 1.5% by weight.

6. The light structural mortar composition of claim 3, wherein the aluminum sulfate is present in an amount of from 0.05 to 2% by weight.

7. A light structural mortar composition comprising:
   a) a type II synthetic anhydrite from 80% to 95% by weight;
   b) calcium hydroxide from 2% to 6% by weight;
   c) light loads weighing less than 1700 kg per dry cubic meter from 4% to 20% by weight, said light loads are volcanic rock selected from natural expanded Piro, Tepezil, Pumicita Jal, Perlite, and mixtures thereof; and
   d) one or more soluble additives of: acrylic styrene resin from 0.05% to 3% by weight, potassium sulfate from 0.03% to 1.5% by weight, and aluminum sulfate from 0.05 to 2% by weight.

8. The light structural mortar composition of claim 7, wherein the additives selected provide the composition with an initial setting time of from 55 to 240 minutes.

9. A method for producing a light structural mortar composition comprising:
   a) combining the materials recited in claim 1; and
   b) homogenously mixing the materials for a time of from 20 to 120 minutes in order to allow crystals to change shape, conglomerate, or entwine.

10. The method of claim 9, further comprising adding water and allowing the mortar to set for a period of 10 to 20 minutes.

* * * * *